United States Patent [19]

Hourvitz et al.

[11] Patent Number: 4,982,343

[45] Date of Patent: Jan. 1, 1991

[54] METHOD AND APPARATUS FOR DISPLAYING A PLURALITY OF GRAPHIC IMAGES

[75] Inventors: Leonard J. Hourvitz, La Honda; John K. Newlin, Palo Alto; Richard A. Page, Los Altos Hills, all of Calif.

[73] Assignee: NeXT, Inc., Redwood City, Calif.

[21] Appl. No.: 255,472

[22] Filed: Oct. 11, 1988

[51] Int. Cl.[5] .............................................. G06F 15/20

[52] U.S. Cl. .................................... 364/521; 340/716; 340/798; 364/518

[58] Field of Search ........... 364/518, 521, 522, 709.01; 340/701, 703, 721, 723, 798–800, 716; 365/230

[56] References Cited

U.S. PATENT DOCUMENTS 4,827,249 5/1989 Chawvel et al. ............... 340/799 X 4,833,657 5/1989 Tanaka ............................ 340/799 X

OTHER PUBLICATIONS

T. Porter et al., "Compositing Digital Images", *Computer Graphics*, vol. 18, No. 3, pp. 253–259 (Jan. 1984).

D. Salesin et al., "Two-Bit Graphics", *IEEE CG & A*, (Jun. 1986), pp. 26–42.

*Primary Examiner*—Dale M. Shaw

*Assistant Examiner*—H. R. Herndon

*Attorney, Agent, or Firm*—Laurence S. Rogers; Jeffrey H. Ingerman

[57] ABSTRACT

A method and apparatus for performing graphic compositing operations in a computer system, with improved system performance, is provided. The apparatus and method performs the plurality of compositing operations by implementing a series of write functions, selected from a group of write functions, in a predetermined combination or order.

47 Claims, 4 Drawing Sheets

FIG. 2A

| AB | B: 00 | 01 | 10 | 11 |
|---|---|---|---|---|
| A: 00 | 00 | 00 | 00 | 00 |
| 01 | 00 | 00 | 01 | 01 |
| 10 | 00 | 01 | 01 | 10 |
| 11 | 00 | 01 | 10 | 11 |

FIG. 2B

| CEILING (A+B) | B: 00 | 01 | 10 | 11 |
|---|---|---|---|---|
| A: 00 | 00 | 01 | 10 | 11 |
| 01 | 01 | 10 | 11 | 11 |
| 10 | 10 | 11 | 11 | 11 |
| 11 | 11 | 11 | 11 | 11 |

| (1-A)B | B: 00 | 01 | 10 | 11 |
|---|---|---|---|---|
| A: 00 | 00 | 01 | 10 | 11 |
| 01 | 00 | 01 | 01 | 10 |
| 10 | 00 | 00 | 01 | 01 |
| 11 | 00 | 00 | 00 | 00 |

FIG. 2C

| A+B-AB | B: 00 | 01 | 10 | 11 |
|---|---|---|---|---|
| A: 00 | 00 | 01 | 10 | 11 |
| 01 | 01 | 10 | 10 | 11 |
| 10 | 10 | 10 | 11 | 11 |
| 11 | 11 | 11 | 11 | 11 |

FIG. 2D

METHOD AND APPARATUS FOR DISPLAYING A PLURALITY OF GRAPHIC IMAGES

BACKGROUND OF THE INVENTION

This invention relates to the display on a computer monitor or other video screen of a plurality of graphic images. In particular, this invention relates to a method and apparatus for displaying a composite of the plurality of images in accordance with a desired compositing operation.

Some computers use graphic images in the user interfaces of their operating systems. In addition, many computers are capable of executing programs which produce graphic displays, or which are used to produce and manipulate graphic images as their end product. Graphic images of the type of concern in this invention are made up of pixels. Each pixel is represented within the computer by pixel information or data having a portion indicative of the color level of the pixel, and a portion indicative of the degree of coverage, or opacity, of the pixel.

In an actual color computer system, such as one using an RGB monitor, pixel color level data typically represent the individual levels of red, green, and blue primary color components of the pixel. In a monochromatic system, such data typically represent only the gray level (ranging from white to black) of the pixel. In the discussion which follows, the present invention is explained in an exemplary context of a monochromatic computer system, in which the color level data of each pixel represent the monochromatic gray level of the pixel. It will be appreciated by those skilled in the art, however, that the present invention may also be used in a true color (e.g., RGB) system by applying the disclosed techniques to the individual data representing the color components of the pixel. Thus, as used below, the phrases "color level" and "color component level" are to be understood as meaning either the monochromatic gray level, or the level of a color component, of a pixel.

Pixel color level and opacity data each range from a minimum to a maximum. In a monochromatic system, color (gray) level ranges from white to black, while opacity ranges from transparent to opaque. The precision of the range depends on the number of bits used in the particular computer system to represent the graphic components. In a one-bit graphics monochromatic system, each component of pixel data (gray level and opacity) can assume either of only two values (0 or 1), with no intermediate representation. Thus, in such a system a pixel's gray level could only be white (0) or black (1) with nothing in between, while opacity could only be completely transparent (0) or totally opaque (1). In a two-bit graphics system, the data may assume any of four possible values (00, 01, 10, 11) so that each portion of pixel data can assume two intermediate values representative of shades of gray and degrees of transparency. With additional bits, greater precision is possible.

When two or more graphic images are manipulated on a computer display, it may be desired, as part of the manipulation, to cause one image to overlap or cover the other to produce a composite image. For example, it may be desired to place an image of a person in front of an image of a house, to produce a single composite image of the person standing in front (and obscuring a portion) of the house. Or, it may be desired to place a fully or partially transparent image (e.g., a window) over an opaque image (e.g, a person) to allow the image of the person to show through the window. The resulting composite image will depend on the precise nature of the compositing manipulation, and on the degree of color and opacity of each pair of overlapping pixels.

In T. Porter et al., "Compositing Digital Images", *Computer Graphics*, vol. 18, no. 3, pp. 253–259 (July 1984), twelve possible compositing operations are described for combining pixel color data and opacity data from two images to produce pixel data for a third composite image. The twelve operations, operating on images A (the source, or first input, image) and B (the destination, or second input or output, image), are:

1. A over B. The image resulting from this operation shows all of A and all of B except that portion of B covered by a portion of A. Stated another way, this operation results in a composite image showing image A wherever A is opaque, and image B elsewhere.
2. B over A. The image resulting from this operation shows all of B and all of A except that portion of A covered by a portion of B. Stated another way, this operation results in a composite image showing image B wherever B is opaque, and image A elsewhere.
3. A in B. The image resulting from this operation shows only that part of A overlapping B, and none of B.
4. B in A. The image resulting from this operation shows only that part of B overlapping A, and none of A.
5. A out B. The image resulting from this operation shows all of A except that part of A overlapping B, and none of B.
6. B out A. The image resulting from this operation shows all of B except that part of B overlapping A, and none of A.
7. A atop B. The image resulting from this operation shows only that part of A overlapping B and that part of B not overlapped by A.
8. B atop A. The image resulting from this operation shows only that part of B overlapping A and that part of A not overlapped by B.
9. A xor B. The image resulting from this operation shows only those parts of A and B not overlapping.
10. Clear. The image resulting from this operation is a clear transparent screen, regardless of the original appearances of A and B.
11. A. The image resulting from this operation is only A.
12. B. The image resulting from this operation is only B.

Porter et al. show a generalized equation, having four operands, for calculating both the color and opacity portions of a composite image of A and B. The data for images A and B are considered to range in value from 0 to 1 for arithmetic purposes, represented by as many bits as the graphics system uses for such purposes. The equation has the form $XA+YB$, where X and Y are coefficients taught by Porter et al. for each of the twelve operations. The same generalized equation (applying the same coefficients to different pixel data terms) is used for calculating the pixel's color level and opacity components. In a monochromatic system, therefore, the equation is used twice (once for gray level, and once for opacity, data). This requires at least four multiplication steps and two addition steps to composite each pixel. In an RGB color system, the equation is used four times (once each for the red, green, and blue color level data, and once for opacity). This requires at least eight multiplications and four additions. The result is that in a computer system capable of producing high resolution graphics images comprised of hundreds of thousands of pixels, the compositing operation can be slow.

It therefore would be desirable to be able to reduce the computer resources required to perform compositing operations, and thus to enhance the speed of the compositing process.

SUMMARY OF THE INVENTION

It is an object of the present invention to reduce the computer resources required to perform compositing operations, and thus to enhance the speed of combining two images to produce a composite image.

In accordance with the invention, an apparatus and method are provided for creating and displaying an output graphic image which is a composite of first and second input graphic images. Each of the first input, second input, and output graphic images is formed of a plurality of pixels. Each pixel is represented by a set of digital data. The set of digital data includes a color level portion indicative of the level of a color component of the pixel (gray level, or red, green, blue or other color component level), as well as a portion indicative of the opacity of the pixel. The output image represents the result of a selected one of a first group of compositing operations on those sets of digital data representing the first and second input graphic images. The apparatus includes a first means for storing the digital data representing the first input graphic image, and a second means for storing the digital data representing the second input graphic image. The apparatus implements one or more of a second group of operations in a selected order to successively transform pixel color level and opacity data stored in the second storing means based on data stored in the first storing means. As a result of the transformations, the result of the second operation is stored in the second storing means in substitution for the pixel data originally there. A display means displays the data in the storing means.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIGS. 2A-2D (hereinafter collectively referred to as FIG. 2) show computational results produced by apparatus implementing the method of the present invention in a two-bit graphics system;

DETAILED DESCRIPTION OF THE INVENTION

Figure 1:
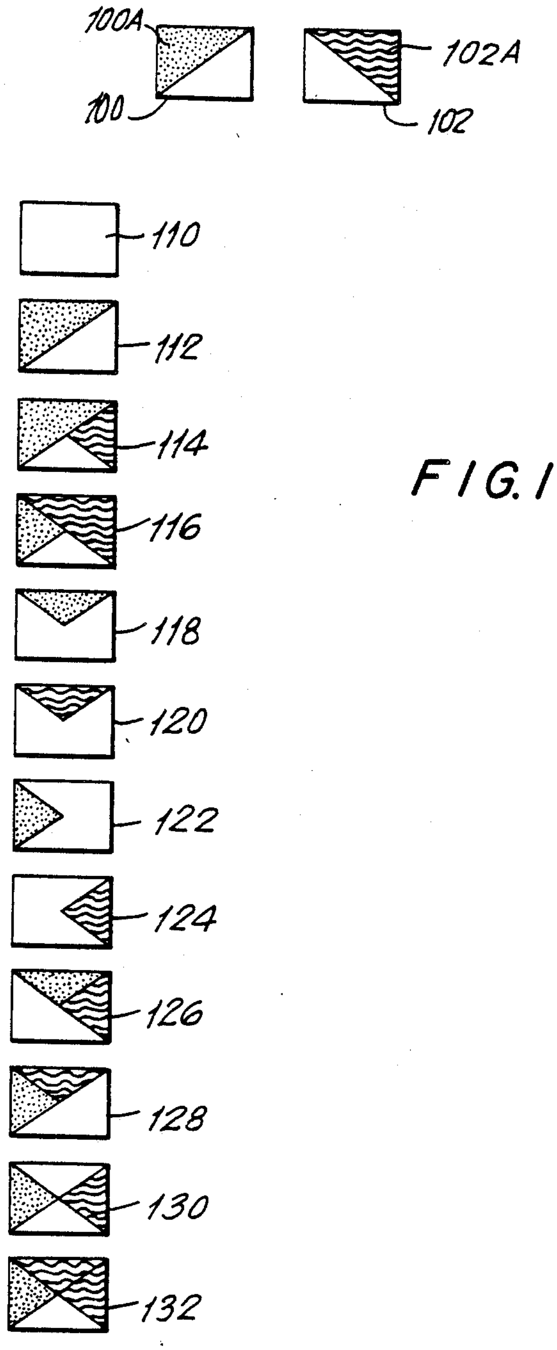
FIG. 1 shows some of the compositing operations performed by the present invention.

FIG. 1 illustrates several compositing operations of the type which the present invention implements. Item 100 illustrates an original image, designated the "source" image, which has an opaque portion 100A, and is transparent white elsewhere. Item 102 similarly illustrates an original image, designated the "destination" image, with which source image 100 is to be combined in accordance with one of a group of compositing operations. Image 102 likewise has an opaque portion 102A, and is transparent white elsewhere. Items 110-132 illustrate composite images which result after particular compositing operations are performed using original source image 100 and destination image 102, as follows:

1. Image 110 shows the composite image which results as a consequence of the Porter et al. Clear operation. Image 110 is transparent white.
2. Image 112 shows the result of a Copy operation (corresponding to the Porter et al. "A" operation). This operation substitutes the source image for the original destination image without combining them. The resulting composite image 112 is the same as original source image 100.
3. Image 114 shows the composite image resulting from the operation Source over Destination, corresponding to the Porter et al. A over B operation.
4. Image 16 shows the composite image resulting from the operation Destination over Source, corresponding to the Porter et al. B over A operation.
5. Image 118 shows the composite image resulting from the operation Source in Destination, corresponding to the Porter et al. A in B operation.
6. Image 120 shows the composite image resulting from the operation Destination in Source, corresponding to the Porter et al. B in A operation.
7. Image 122 shows the composite image resulting from the operation Source out Destination, corresponding to the Porter et al. A out B operation.
8. Image 124 shows the composite image resulting from the operation Destination out Source, corresponding to the Porter et al. B out A operation.
9. Image 126 shows the composite image resulting from the operation Source atop Destination, corresponding to the Porter et al. A atop B operation.
10. Image 128 shows the composite image resulting from the operation Destination atop Source, corresponding to the Porter et al. B atop A operation.
11. Image 130 shows the composite image resulting from the operation Source xor Destination, corresponding to the Porter et al. A xor B operation. This operation should not be confused with the different technique, sometimes used by others in computer graphics but not used here, of placing a first image over a second image by causing a logical exclusive-or of the pixel data of the first image with the pixel data of the second image. The logical exclusive-or technique is used, for example, to place a cursor over an underlying image, without destroying the underlying image data. A subsequent logical exclusive-or of the cursor image data with the combined image removes the cursor and restores the underlying image due to a property of the logical exclusive-or operation.
12. Image 132 shows the composite image resulting from the operation Source plus Destination. This operation produces a composite image which is the simple addition of the color and opacity values of the source and original destination images.

As discussed above, each of the Porter et al. operations illustrated in FIG. 1 can be performed by solving the generalized Porter et al. equation. However, the solution of that equation can be a relatively slow process.

It has been found that if the generalized equation is solved for each of the compositing operations, the various resulting specific equations all can be written as combinations of four dyadic operators. In addition, it has been found that if each of the dyadic operators is implemented as a write function which takes as inputs two values in two memory locations and writes a result into one of those same locations, the speed with which the general equation can be solved to produce a desired composite graphics image is increased. In the notation used hereafter, one of the two graphic images is designated the "source", S, while the other is designated the "destination", D. When a write function is performed on source and destination data, the destination data is transformed based on the source data. The result is written into the memory location of the destination, substituting for the data originally in that memory location.

The four dyadic write functions are as follows:

Write Function 0: D←SD (hereafter $WF_0(D)$);

Write Function 1: D←ceiling(S+D) (hereafter $WF_1(D)$);

Write Function 2: D←(1−S)D (hereafter $WF_2(D)$); and

Write Function 3: D←S+D−SD (hereafter $WF_3(D)$).

As will be understood by persons skilled in the art, Write Function 0 means to multiply the value of source image pixel data (either color or opacity, depending on which Porter et al. equation is being solved) stored in the source image memory by the value of pixel data stored in the destination image memory, and to store the product in the destination memory in substitution for destination image pixel data originally there. Similarly, Write Function 1 means to add the value of source image pixel data to the value of destination image pixel data, and to store the sum (not to exceed a ceiling, or maximum, of 1) in the destination memory in substitution for the destination image data originally there. Write Functions 2 and 3 operate likewise, in accordance with their dyadic equations. Thus, Write Function 2 computes (1−S)D, and substitutes the result for the originally stored destination data D. Write Function 3 computes S+D−SD, and substitutes the result of that computation for the originally stored value of D.

In addition, the following operators have been found to be useful:

D←0,

D←1,

D←S,

Buffer←S, and

D←Buffer.

D77 0 means to set pixel daLa stored in destination memory to 0. This causes the destination memory pixel to become white or clear (depending on which portion of pixel data, color or opacity, is modified). The operator D←1 means to set destination pixel data to 1. The operator D←S similarly means to write the value of source pixel data (color or opacity) into the destination memory in substitution for pixel data originally stored there.

Buffer←S and D←Buffer are used when it is necessary to write data to or from a separate buffer memory, rather than directly to the destination image memory. The operator Buffer←S causes source image pixel data (color or opacity) stored in the source memory to be copied into the buffer memory. The second operator, D←Buffer, copies data from the buffer to the destination memory. Once source image data has been copied to the buffer memory using the operator Buffer←S, destination image data stored in the destination memory may be written into the buffer and transformed using any of the Write Functions 1-4. When this is done the equation appears generally as follows: $WF_x$(Buf)←D, where x represents the particular Write Function being invoked. When a buffer is used in this way, the buffer serves as the "destination" for the four Write Functions but in fact then holds data which is source data for a subsequent dyadic step. As will be apparent from the discussion which follows, the two buffer operators are useful in implementing inverse compositing operations (e.g., "B Over A" rather than "A Over B"), or otherwise when it is necessary to transform destination data as a function of source data rather than the other way around.

The present invention implements the various compositing operations illustrated in FIG. 1 using a selected one or more of the above-described Write Function operations, executed in a selected combination or order. Table I, below, lists exemplary Write Function steps, in as appropriate order, to implement these operations.

TABLE I

| Operation | Color/ Opacity | Porter et al. Equations | Write Function Steps |
|---|---|---|---|
| S Over D | color | $\delta_c = \delta_s + (1 - \alpha_s)\delta_d$ | $WF_2(\delta_d) \leftarrow \alpha_s$; $WF_1(\delta_d) \leftarrow \delta_s$ |
| | opacity | $\alpha_c = \alpha_s + \alpha_d - \alpha_s\alpha_d$ | $WF_3(\alpha_d) \leftarrow \alpha_s$ |
| S In D | color | $\delta_c = \delta_s\alpha_d$ | $\delta_d \leftarrow \delta_s$; $WF_0(\delta_d) \leftarrow \alpha_d$ |
| | opacity | $\alpha_c = \alpha_s\alpha_d$ | $WF_0(\alpha_d) \leftarrow \alpha_s$ |
| S Out D | color | $\delta_c = (1 - \alpha_d)\delta_s$ | $\delta_d \leftarrow \delta_s$; $WF_2(\delta_d) \leftarrow \alpha_d$ |
| | opacity | $\alpha_c = (1 - \alpha_d)\alpha_s$ | buf$\leftarrow \alpha_s$; $WF_2$(buf)$\leftarrow \alpha_d$; $\alpha_d \leftarrow$buf |
| S Atop B | color | $\delta_c = \delta_s\alpha_d + (1 - \alpha_s)\delta_d$ | buf$\leftarrow \delta_s$; $WF_0$(buf)$\leftarrow \alpha_d$; $WF_2(\delta_d) \leftarrow \alpha_s$; $WF_1(\delta_d) \leftarrow$buf |
| | opacity | $\alpha_c = \alpha_d$ | NOP |
| D Over S | color | $\delta_c = \delta_d + (1 - \alpha_d)\delta_s$ | buf$\leftarrow \delta_s$; $WF_2$(buf)$\leftarrow \alpha_d$; $WF_1(\delta_d) \leftarrow$buf |
| | opacity | $\alpha_c = \alpha_s + \alpha_d - \alpha_s\alpha_d$ | $WF_3(\alpha_d) \leftarrow \alpha_s$ |
| D In S | color | $\delta_c = \delta_d\alpha_s$ | $WF_0(\delta_d) \leftarrow \alpha_s$ |
| | opacity | $\alpha_c = \alpha_s\alpha_d$ | $WF_0(\alpha_d) \leftarrow \alpha_s$ |
| D Out S | color | $\delta_c = (1 - \alpha_s)\delta_d$ | $WF_2(\delta_d) \leftarrow \alpha_s$ |
| | opacity | $\alpha_c = (1 - \alpha_s)\alpha_d$ | $WF_2(\alpha_d) \leftarrow \alpha_s$ |
| D Atop S | color | $\delta_c = \delta_d\alpha_s + (1 - \alpha_d)\delta_s$ | buf$\leftarrow$a$\delta_s$; $WF_2$(buf)$\leftarrow \alpha_d$; $WF_0(\delta_d) \leftarrow \alpha_s$; $WF_1(\delta_d) \leftarrow$buf |
| | opacity | $\alpha_c = \alpha_s$ | $\alpha_d \leftarrow \alpha_s$ |
| S Xor D | color | $\delta_c = (1 - \alpha_d)\delta_s + (1 - \alpha_s)\delta_d$ | buf$\leftarrow \delta_s$; $WF_2$(buf)$\leftarrow \alpha_d$; $WF_2(\delta_d) \leftarrow \alpha_s$; $WF_1(\delta_d) \leftarrow$buf |
| | opacity | $\alpha_c = (1 - \alpha_d)\alpha_s + (1 - \alpha_s)\alpha_d$ | buf$\leftarrow \alpha_s$; $WF_2$(buf)$\leftarrow \alpha_d$; $WF_2(\alpha_d) \leftarrow \alpha_s$; $WF_1(\alpha_d) \leftarrow$buf |
| S Plus D | color | $\delta_c = \delta_s + \delta_d$ | $WF_1(\delta_d) \leftarrow \delta_s$ |
| | opacity | $\alpha_c = \alpha_s + \alpha_d$ | $WF_1(\alpha_d) \leftarrow \alpha_s$ |

Persons of ordinary skill in the art will understand from Table I how to implement any of the compositing operations shown in FIG. 1 in accordance with the method of the present invention. For example, Table I lists the Write Function steps for implementing the Source over Destination operation. As previously explained, this operation is the placement of a foreground or source image stored in a first or source memory location over a background or destination image stored in a second or destination memory location, to produce a composite image stored in the second (destination) memory. The Porter et al. equation for producing composite color level pixel data for this operation includes three operands ($\delta_d$, $\delta_s$ and $\alpha_s$), and the corresponding Porter et al. opacity equation includes two operands ($\alpha s$ and $\alpha_d$). The equations are:

$$\delta_c=\delta_s+(1-\alpha_s)\delta_d \text{ (for pixel color level data), and} \quad (1)$$

$$\alpha_c=\alpha_s+(1-\alpha_s)\alpha_d \text{ (for pixel opacity data),} \quad (2)$$

where:

- $\delta_c$ is the color level component value for a pixel of the composite image,
- $\delta_s$ is the color level component value for a pixel of the source image,
- $\delta_d$ is the color level component value for a pixel of the destination image,
- $\alpha_c$ is the opacity value for a pixel of the composite image,
- $\alpha_s$ is the opacity value for a pixel of the source image, and
- $\alpha_d$ is the opacity value for a pixel of the destination image.

Table I shows that these two compositing operation equations can be implemented in a computer system by using selected ones of the four dyadic (two-operand) Write Functions, executed in a predetermined order, to successively transform color level and opacity pixel data of the destination image as a function of color or opacity pixel data of the source image. The steps are as follows:

$$WF_2(\delta_d)\leftarrow\alpha_s,\ WF_1(\delta_d)\leftarrow\delta_s \text{ (for pixel color level data); and} \quad (3)$$

$$WF_3(\alpha_d)\leftarrow\alpha_s \text{ (for pixel opacity data).} \quad (4)$$

Write Function operations (3) define a two-step process for transforming pixel color level data ($\delta$) for the destination image into pixel color level data for the desired composite image. The first step causes the color value of the destination image pixel ($\delta_d$) to be modified or transformed as a function of the opacity component value of the source image pixel ($\alpha_s$) using Write Function 2. From inspection of Write Function 2, it will be seen that this first step computes an intermediate pixel color value ($\delta_d'$) equal to $(1-\alpha_s)\alpha d$, and substitutes this intermediate value for the original value of $\delta_d$ stored in the destination memory. Then, in the next step, the just computed intermediate color level value of the destination image pixel ($\delta_d'$) is modified as a function of the color component value of the source image pixel ($\delta_s$) using Write Function 1, and the resulting color level value ($\delta_d''$) is stored in the destination memory in substitution for the intermediate color value ("$_d'$). From inspection of Write Function 1, it will be apparent that the value of $\delta_d''$ is equal to $\delta_s+(1-\alpha_s)\alpha_d$. This is the correct value for the color level of the composite image pixel.

The opacity value ($\alpha$) of the composite image pixel is calculated next. Write Function operation (4) defines a one-step process for producing the desired composite image pixel opacity value. In accordance with step (4), the opacity value of the destination image pixel ($\alpha_d$) is transformed based on the opacity value of the source image pixel ($\alpha_s$) using Write Function 3, and the resulting value is stored in the destination memory in substitution for the opacity value originally there. From inspection of Write Function 3, it will be seen that this computes and stores in the destination memory a value ($\alpha_d'$) equal to $\alpha_s+\alpha_d-\alpha_s\alpha_d$. This new value represents the correct opacity value of the composite image pixel.

As another example, Table I lists Write Function steps for combining source and destination images in accordance with the Porter et al. "Source atop Destination" compositing operation. The Porter et al. equations for this operation are:

$$\delta_c=\delta_s\alpha_d+(1-\alpha_s)\alpha_d \text{ (for pixel color level data), and} \quad (5)$$

$$\alpha_c=\alpha_d \text{ (for pixel opacity data).} \quad (6)$$

Table I shows that this compositing operation is implemented in accordance with the method of the invention as follows:

$$\text{Buffer}\leftarrow\delta_s;\ WF_0(\text{Buffer})\leftarrow\alpha_d;\ WF_2(\delta_d)\leftarrow\alpha_s;\ WF_1(\delta_d)\leftarrow\text{Buffer} \text{ (for pixel color level data).} \quad (7)$$

Because the opacity value of the composite image pixel is the same as that of the destination image pixel (see equation (6)), the original destination image opacity values need not be changed and no Write Function steps are required to be performed for opacity values.

Equations (7) define a four-step process for producing composite image pixel color level values, and illustratively demonstrate the use of buffer memory. In the first step, the color level value of the source image pixel ($\delta_s$) is copied into the buffer. Next, the color level value of the buffered source image pixel ($\delta_s$) is transformed as a function of the destination image pixel opacity value ($\alpha_d$) in accordance with Write Function 0. These two steps cause $\delta_s$ to be multiplied by $\alpha_d$. The product (corresponding to the first term of equation (5)) is stored in the buffer (serving as a "destination" for this step) in substitution for the source image color level value ($\delta_s$) originally there. In the third step, Write Function 2 transforms $\delta_d$ (the destination image pixel color level value) as a function of a value) $\alpha_s$ (the source image pixel opacity value) stored in the source memory. This step computes the value $(1-\alpha_s)\delta_d$ (the second term of equation (5)), and stores that value in the destination memory in substitution for the value $\delta_d$ originally there. Finally, Write Function 1 in the last step causes the value in the buffer ($\delta_s\alpha_d$) to be added to the value in the destination memory ($((1-\alpha_s)\delta_d)$), as required by equation (5), and the sum to be stored in the destination memory in substitution for the value ($((1-\alpha_s)\delta_d)$) originally there. At the conclusion of this fourth step, the color level value stored in the destination memory represents the correct color level value for the composite image.

From the foregoing two examples, explaining entries in Table I for the operations Source over Destination and Source atop Destination, the remaining entries in Table I and the method of the present invention will be understood to persons of ordinary skill in the art.

The foregoing compositing method can be implemented entirely in software on nearly any conventional monochromatic or color general purpose computer system, using conventional programming techniques. For instance, the method may be implemented on a Model 3/50 computer, manufactured by Sun MicroSystems, Inc. of Mountain View, Calif. Alternatively, high-speed logic circuitry may be used to implement the dyadic write functions. By implementing the write functions this way, much higher compositing speeds and improved system performance are achieved. An exemplary embodiment of a computer system incorporating such circuitry is described below.

In the exemplary computer system with which the invention may be used, each pixel making up a graphic image is represented by data including a two bit "delta" portion (δ) indicating the monochromatic color level (shade of gray) of the pixel, and a two bit "alpha" portion (α) indicating the degree of coverage or opacity of the pixel. Each delta value may be 00 (white), 01 ($\frac{1}{3}$ black, or light gray), 10 ($\frac{2}{3}$ black, or dark gray), or 11 (black). Similarly each alpha value may be 00 (meaning that the pixel is totally transparent and the background shows through), 01 ($\frac{2}{3}$ transparent), 10 ($\frac{1}{3}$ transparent), or 11 (meaning that the pixel is opaque and no background shows through).

In addition, because color values are premultiplied by alpha values, the color value of a pixel can never exceed its alpha value. Thus a pixel which is $\frac{2}{3}$ transparent and $\frac{1}{3}$ solid black has data values of 01 for both delta (color) and alpha (opacity). This means that in a compositing operation placing this pixel over some background pixel, $\frac{2}{3}$ of the background color will show through and the other $\frac{1}{3}$ will be contributed by the black part of the foreground pixel. A pixel with a delta value of 10 (dark gray), and opacity value of 10 ($\frac{2}{3}$ opaque) can also be thought of as $\frac{2}{3}$ covered with black. On the other hand, a pixel with a delta (color) value of 01 (light gray) and an opacity value of 11 (opaque), can be thought of as fully covered with a mix of $\frac{1}{3}$ black and $\frac{2}{3}$ white paint. The extremes of ranges of color and opacity are summarized below in Table II.

TABLE II

| Delta | Alpha | Pixel |
|---|---|---|
| 00 | 00 | Transparent white |
| 00 | 11 | Opaque white |
| 11 | 11 | Opaque black |
| 11 | 00 | Not valid |

When the dyadic Write Functions of the present invention are used with two-bit graphics, results may be produced for which no data representation is completely accurate. For instance, Write Function 0 causes a multiplication. If the ,values multiplied by this Write Function were 01 ($\frac{1}{3}$) and 01 ($\frac{1}{3}$), the product would be 1/9—a number which cannot be represented using only two bits. To accommodate this, the system implementing the four Write Functions rounds off results to the nearest value which can be represented by two bits.

FIG. 2 shows how the results computed by each of the four Write Functions are rounded in a two-bit graphics system. FIG. 2A illustrates the results computed by Write Function 0 for each different combination of two-bit (A) source and destination (B) input values. FIG. 2B shows the results computed by Write Function 1 for all combinations of source and destination input data. Similarly, FIGS. 2C and 2D show the results computed by Write Functions 2 and 3, respectively. In each case in which the actual result of a computation cannot be represented by only two bits, the result shown in FIGS. 2A–2D is rounded down or up to the nearest two bit value. For example, in FIG. 2A, the product of 01 and 01 (1/9) is rounded down to 00, while the product of 10 and 01 (2/9) is rounded up to 01 ($\frac{1}{3}$). FIG. 2B shows that Write Function 1 produces a result of 11 whenever the sum of the source and destination data equals or exceed 11, the maximum which can be represented by two bits.

Figure 3:
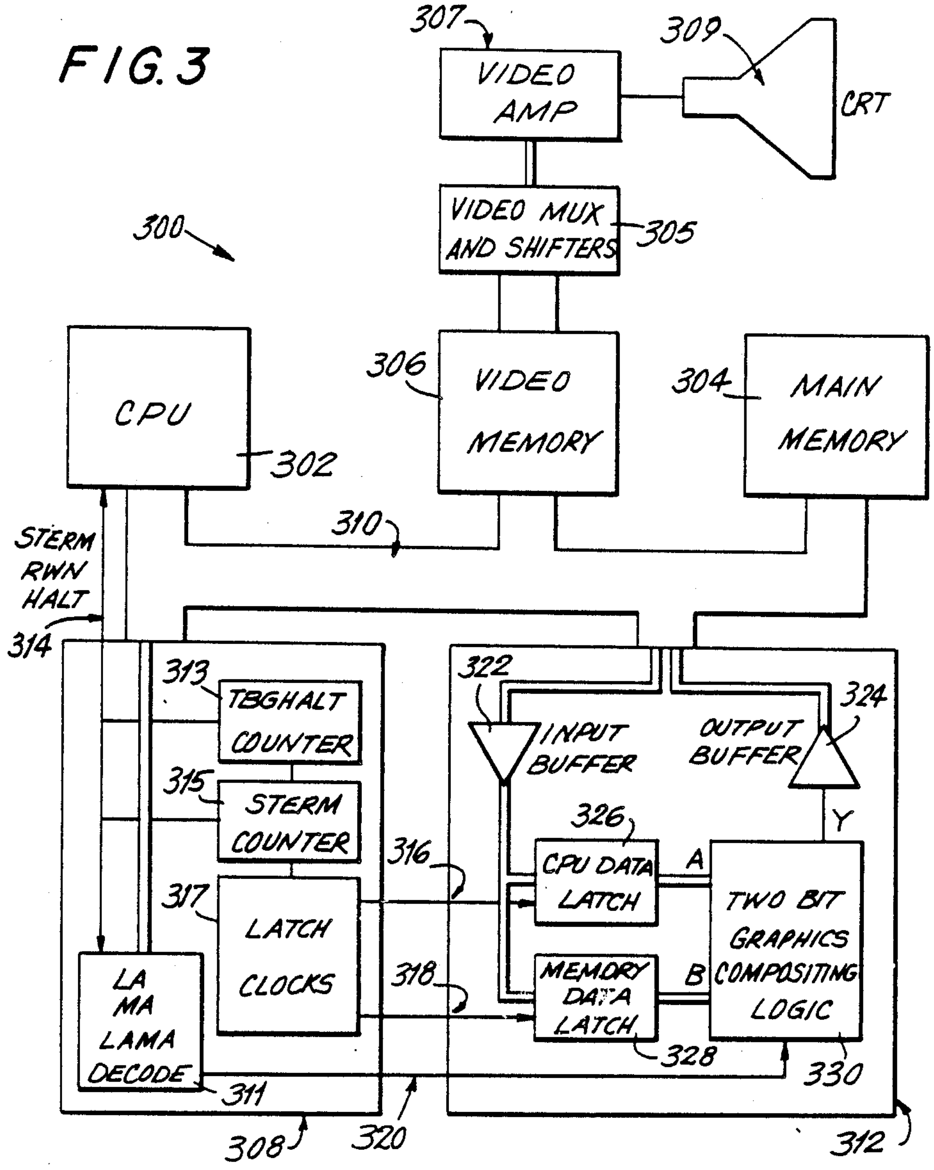
FIG. 3 shows an exemplary embodiment of a computer system which implements the present invention.

FIG. 3 shows a preferred embodiment of a hardware system 300 implementing the present invention as part of a computer system. In FIG. 3, system 300 includes CPU 302, main memory 304, video memory 306, graphics control logic 308, and compositing circuitry 312. These components are interconnected via multiplexed bidirectional system bus 310, which may be conventional. Bus 310 contains 32 address lines (from A0 to A31) for addressing any portion of memory 304 and 306, and for addressing compositing circuitry 312. System bus 310 also includes a 32 bit data bus for transferring data between and among CPU 302, main memory 304, video memory 306, and compositing circuitry 312. In the preferred embodiment of system 300, CPU 302 is a Motorola 68030 32-bit microprocessor, but any other suitable microprocessor or microcomputer may alternatively be used. Detailed information about the 68030 microprocessor, in particular concerning its instruction set, bus structure, and control lines, is available from *MC*68030 *User's Manual*, published by Motorola Inc., of Phoenix, Ariz.

Main memory 304 of system 300 comprises eight megabytes of conventional dynamic random access memory, although more or less memory may suitably be used. Video memory 306 comprises 256K bytes of conventional dual-ported video random access memory. Again, depending on the resolution desired, more or less such memory may be used. Connected to a port of video memory 306 is video multiplex and shifter circuitry 305, to which in turn is connected video amp 307. Video amp 307 drives CRT raster monitor 309. Video multiplex and shifter circuitry 305 and video amp 307, which are conventinnal, convert pixel data stored in video memory 306 to raster signals suitable for use by monitor 309. Monitor 309 is of a type suitable for displaying graphic images having a resolution of 1120 pixels wide by 832 pixels high.

The pixel data for images displayed on monitor 309 are stored in both video memory 306 and main memory 304. Video memory 306 stores two bits of gray level data for each pixel of a displayed image, and a portion of main memory 304 stores two bits of opacity data for each pixel. Storing opacity data in main memory 304 allows the use of less video memory than otherwise would be required. It will be appreciated, however, that pixel opacity data could be stored in video memory 306 together with the pixel level data if desired.

During compositing operations, video memory 306 serves as a destination memory for gray level data representing the input "destination" image, and the final composite image. (Alternatively, a portion of main memory 304 may be used for this purpose by copying data from video memory 306 to memory 304, modifying the pixel data in memory 304, and copying the data representing the final composite image back to the video memory 306 when compositing is complete. By modifying pixel level data in main memory 304, rather than in video memory 306, changes to displayed images can be accomplished off-screen and transparently to the user.) Also, the portion of main memory 304 storing pixel opacity data serves as a destination memory for that data for both the input destination image and the final composite image. Another portion of main memory 304 serves as source memory for source image pixel (gray level and opacity) data. Another portion of main memory 304 serves as a buffer memory for use, as may be necessary, in implementing certain compositing operations as described, above.

Main memory 304 and video memory 306 occupy different address ranges. In addition to the two ranges of addresses which allow normal access to main memory 304 and video memory 306, system 300 supports four address ranges for both main and video memory which allows writing one of four dyadic functions of source data and destination data to either memory on a two bit basis. System 300 thus enables CPU 302 to write data to a location in either video or main memory such that, prior to the data being written to the memory, it is transformed to new data as a function of the data stored in the memory location being written to. The ranges of memory to which CPU 302 can write data, and their functions, are set forth in Table III, below:

TABLE III

| Address Range | Location | Write Transformation | Value When Read |
|---|---|---|---|
| $04000000–$07FFFFFF | main memory | none | |
| $0B000000–$0BFFFFFF | video memory | none | |
| $0C000000–$0CFFFFFF | video memory | S + D − SD | Reads as 0's |
| $0D000000–$0DFFFFFF | video memory | (1 − S)D | Reads as 0's |
| $0E000000–$0EFFFFFF | video memory | ceiling(S + D) | Reads as 0's |
| $0F000000–$0FFFFFFF | video memory | SD | Reads as 1's |
| $10000000–$10FFFFFF | main memory | S + D − SD | Reads as 0's |
| $14000000–$14FFFFFF | main memory | (1 − S)D | Reads as 0's |
| $18000000–$1BFFFFFF | main memory | ceiling(S + D) | Reads as 0's |
| $1C000000–$1FFFFFFF | main memory | SD | Reads as 1's |

Table III is self-explanatroy. The "Write Transformation" column shows, for example, that to write a source image pixel data to relative memory location $OOFFFFFF within video memory 306, without any transformation, the data is addressed to $OBFFFFFF. However, to write data to that same location in video memory 306 using Write Function 0, the data is addressed to $OFFFFFFF.

Table III, in the column labelled "Value When Read", further shows that when reading the data from some of the write function address ranges, the hardware returns all 1's or all 0's instead of actually returning the data. Although not required, this facilitates the use of read-modify-write instructions of certain processors (such as the "bit field insert", or BFINS, instruction of the Motorola 68030 microprocessor) in implementing software for carrying out the method of the invention, where it is desired to perform a compositing step on only a portion of a 32-bit data word in destination memory.

The write functions set forth in Table III are accomplished in system 300 by graphics control 308 and compositing circuitry 312. These two circuits control the transfer of pixel data between CPU 302, video memory 306, and main memory 304. Graphics control 308 is connected to and, as discussed below, controls CPU 302 via control lines 314. Control lines 314 include STERM (Synchronous Termination), HALT, and RWN (Read/Not Write) (detailed information about these control lines is available from the 68030 *User's Manual*).

Graphics control includes a three bit counter 313, a two bit counter 315, and latch logic 317. Three bit counter 313 is clocked by the CPU clock and generates a control signal TBGHALT as described below. Two bit counter 315 counts STERM transitions appearing on the STERM control line of CPU 302. Finally, as also discussed in more detail below, latch logic generates clock signals on lines 316 and 318.

Graphics control 308 is also connected to the address bus of system bus 312 via address decode circuit 311. Address decode circuit 311 detects the state of address lines A24, A25, A26, and A27. When CPU 302 writes data to video memory 306 in one of the four transformation address ranges set forth in Table III, above, the state of address lines A24 and A25 determine which one of the four write functions are to be implemented. When CPU 302 writes data to main memory 304 in one of the four transformation address ranges set forth in Table III, the state of address lines A25 and A26 determines which write function is to be implemented. The result of the decoding of address lines A24–A27 appears on control lines 320, shown in FIG. 3 as connected to compositing circuitry 312, as discussed below.

Graphics control 308 sequences the operations required to complete the compositing write functions via control lines 316, 318, and 320 connected to compositing circuitry 312. As shown in FIG. 3, compositing circuitry 312 includes input buffer 322 and output buffer 324. These buffers, each of which is 32 bits wide, serve to connect compositing circuitry 312 to the data bus of system bus 310 in a conventional manner. The output of input buffer 322 is connected to the input of CPU Data Latch 326, to which also is connected control line 316 from graphics control 308. The output of input buffer 322 also is connected to the input of Memory Data Latch 328, to which also is connected control line 318 from graphics control 308. Data latches 326 and 328 are each made up of 32 level sensitive transparent single bit latches. CPU Data Latch 326 holds 32 bits of source image data for 16 pixels written by CPU 302. The source data can be computed by CPU 302 or fetched by the CPU from memory 304 or 306. Memory Data Latch 328, in turn, holds 32 bits of destination image pixel data (representing 16 pixels) currently at the memory location being addressed. The addressed memory location may be in either main memory 304 or video memory 306. Latches 326 and 328 each store data, when enabled by latch clock 317 of graphic control 308, upon receipt of a clock signal transmitted via associated control lines 316 and 318.

The outputs of Data Latches 326 and 328 directly drive inputs A and B of graphics compositing logic 330. The output of compositing logic 330 drive output buffer 324. As shown in more detail in FIG. 4, and as explained below, input A, input B, and output Y each comprise 2 bits. Graphics compositing logic 330 includes sixteen identical 2-bit A inputs, sixteen identical 2-bit B inputs, and sixteen identical 2-bit Y outputs.

Compositing logic 330 preferably includes an array of logic gates which implement each of the dyadic write functions $WF_0$, $WF_1$, $WF_2$, and $WF_3$ at high speed, although circuit 330 could be another type of logic circuitry. In particular, depending on the particular dyadic operation being invoked, compositing logic 330 provides 2 bit data at each output Y as a function of 4 bit data at each of inputs A and B. The data presented at input A represent the color level or opacity of a source image pixel, and the data presented at input B correspondingly represent the color level or opacity of a destination image pixel. The particular dyadic write function performed by compositing logic 330 is determined by control data appearing on control line 320. The output of compositing logic 330 is then written to destination memory in substitution for the destination data applied to input B.

Graphics control 308 sequences the operations required to complete the two graphics write functions (for gray level and opacity data) as follows. As explained above, the particular write function performed is determined by the address range to which CPU 302 writes. Table IV, below, shows which write function is executed as a function of the state of address bits A24–A25 (for video memory), and A26–A27 (for main memory):

TABLE IV

| Address | | Address | | Write Function |
|---|---|---|---|---|
| A25 | A24 | A27 | A26 | Invoked |
| 0 | 0 | 0 | 0 | Y = SD |
| 0 | 1 | 0 | 1 | Y = ceiling(S + D) |
| 1 | 0 | 1 | 0 | Y = (1 − S)D |
| 1 | 1 | 1 | 1 | Y = S + D − SD |

When decode logic 311 detects a write to one of the four address ranges for either main or video memory, counter 315 causes latch logic 317 to enable Data Latch 326 and to clock the CPU data into the latch. In addition, counter 315 causes CPU 302's bus cycle to be terminated by asserting an STERM (Synchronous TERMination) signal issued to CPU 302 via one of control lines 314. Also, CPU 302 is prevented from starting another bus cycle by the assertion by counter 313 of a HALT signal via one of control lines 314. Graphics control 308 then invokes two memory cycles distinguished by the RWN control line—a read cycle followed by a write cycle. The read cycle causes addressed data from video memory 306 or main memory 304 to be read and placed in Memory Data Latch 328. After the data are clocked into data latches 326 and 328, the outputs of the latches are enabled and the data provided as inputs to compositing logic 330. Compositing logic 330 transforms the data at its inputs in accordance with a particular write function, and presents the result of the transformation at its output Y. The write function performed is determined by signals, described below, appearing on line 320. Five signals appearing on line 320, representing the result of the decoding of address lines A24–A27 by decode circuit 311, determine which write function is performed. During the write cycle, the transformed data at output Y is written into the addressed memory location in substitution for the data originally there. After the write cycle is completed, HALT is deasserted and CPU 302 may start another bus cycle.

Figure 4:
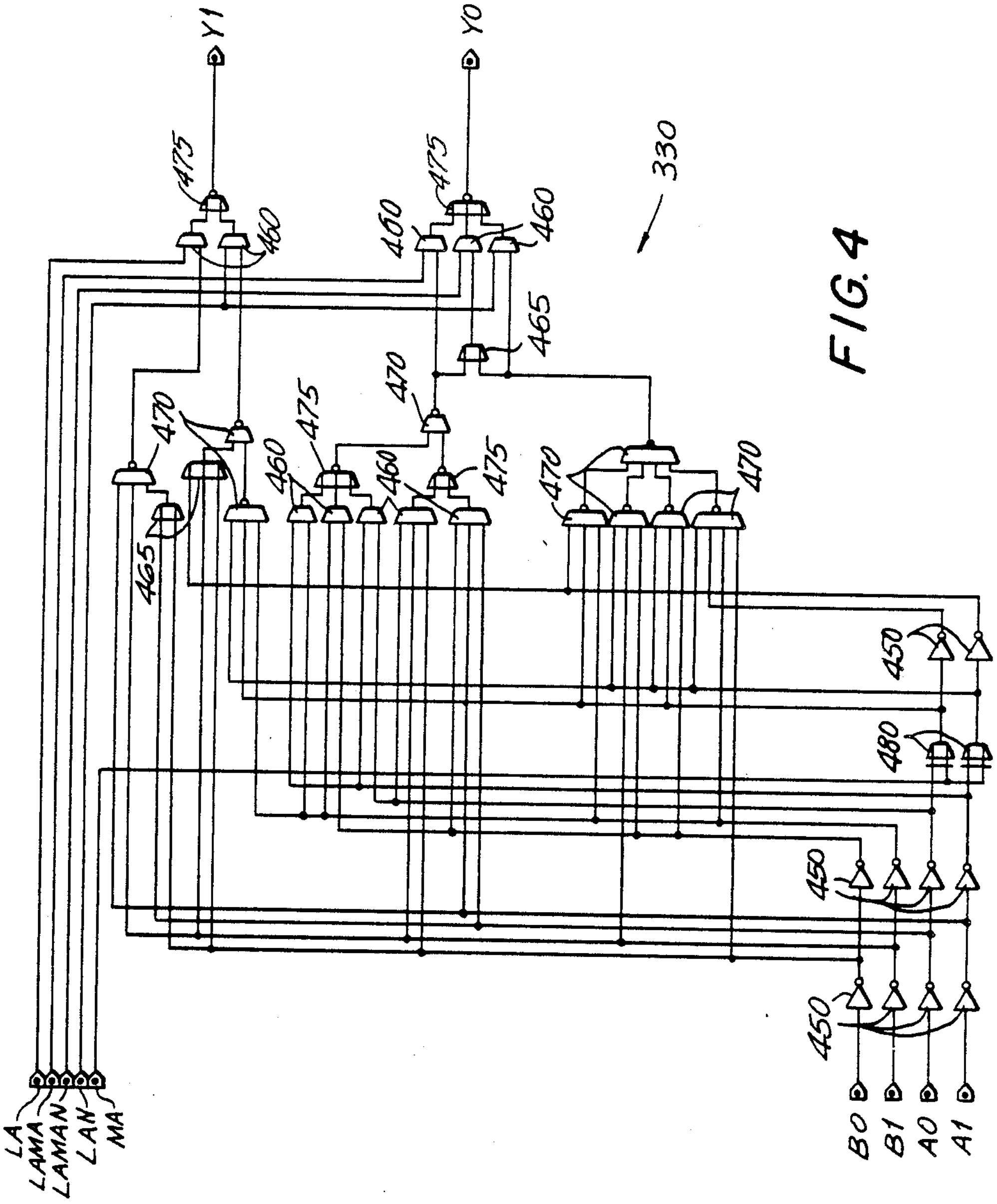
FIG. 4 is a circuit diagram of a portion of the computer system shown in FIG. 3.

A preferred embodiment of compositing logic 330 of compositing circuitry 312 is shown in more detail in FIG. 4. For simplicity's sake, FIG. 4 shows only one-sixteenth of the complete circuitry of compositing logic 330. In fact, in the preferred embodiment the circuitry of FIG. 4 is identically repeated sixteen times in compositing circuitry 312. This allows compositing to proceed for sixteen pixels simultaneously.

Referring now to FIG. 4, compositing logic is shown to include data inputs A0 and A1 (for source image pixel data), and B0 and B1 (for destination image pixel data), corresponding respectively to 2-bit inputs A and B in FIG. 3. The logic also includes outputs Y0 and Y1 corresponding to the 2-bit output Y in FIG. 3. FIG. 4 also shows that control line 320 in fact includes five separate control lines, labelled LA, LAMA, LAMAN, LAN, and MA. LA is the least significant address, and is a function of A24 and A26 for main and video memory, respectively. The signal MA is the most significant address, and is a function of A25 and A27. The signal LAMA is the logical AND of LA and MA. The signal LAMAN is the logical NOT of LAMA. Finally, the signal LAN is the logical NOT of LA. Table V, below, identifies the particular write function performed by compositing logic 330 as a function of the states of the five control signals transmitted by control line 320:

TABLE V

| LA | MA | LAMA | LAMAN | LAN | WRITE FUNCTION PERFORMED |
|---|---|---|---|---|---|
| 0 | 0 | 0 | 1 | 1 | S + D − SD (video memory) |
| 1 | 0 | 0 | 1 | 0 | (1 − S)D (video memory) |
| 0 | 1 | 0 | 1 | 1 | ceiling(S + D) (video memory) |
| 1 | 1 | 1 | 0 | 0 | SD (video memory) |
| 0 | 0 | 0 | 1 | 1 | S + D − SD (main memory) |
| 1 | 0 | 0 | 1 | 0 | (1 − S)D (main memory) |
| 0 | 1 | 0 | 1 | 1 | ceiling(S + D) (main memory) |
| 1 | 1 | 1 | 0 | 0 | SD (main memory) |

FIG. 4 shows that compositing logic 330 includes conventional inverters 450, AND gates 460, OR gates 465, NAND gates 470, NOR gates 475 and XOR gates 480. As will be apparent to persons of ordinary skill in the art, the circuitry shown in FIG. 4 produces outputs at Y0 and Y1 which correspond, as a function of the data at inputs A0, A1, B0 and B1 as well as the states of lines LA, MA, LAMA, LAMAN and LAN set forth in Table V, with the logic tables shown in FIG. 2.

Thus it is shown that the time and computer resources required to perform compositing operations can be reduced. It will be apparent to persons skilled in the art that although four operators have been shown for implementing twelve compositing operations, any greater or lesser number of operators can be used to implement any number of the twelve compositing operations shown above and any other compositing operations. However, the present invention can be practiced by other than the described embodiments, which are presented for purposes of illustration and not of limitation, and the present invention is limited only by the claims which follow.

What is claimed is:

1. Apparatus for displaying a composite graphic image which is a composite of first and second input graphic images, each of said composite, and first and second input, graphic images being represented by at least one respective set of digital data, said composite graphic image representing the result of a selected one of a first group of compositing operations on said sets of digital data representing said first and second input images, wherein at least one of said first group of compositing operations includes at least three operands, said apparatus comprising:

first means for storing said digital data representing said first input graphic image;

second means for storing said digital data representing said second input graphic image;

operator means in data transfer relationship with said first and second storing means for implementing at least one of a second group of operations on digital data stored in said first and second storing means, and for storing a result of said second operation in said second storing means in substitution for said digital data stored in said second storing means, said at least one second operation selected from the group including the operations SD, S+D, (1−S)D, and S+D−SD, where S and D respectively represent the values of digital data stored in said first and second storing means;

processor means in controlling relationship with said operator means, said processor means performing said selected one of said first group of compositing operations by causing said operator means to perform a predetermined sequence of one or more of said second group of operations to produce said set of digital data representing said composite graphic image in said second storing means; and means for converting said set of composite graphic image digital data into signals for display of said composite graphic image.

2. The apparatus of claim 1, further comprising:

buffer means for storing digital data representing said first graphic image; wherein said processor means causes said operator means to perform at least one of said second group of operations on digital data stored in said second storing means and said buffer means, and to store a result of said second operation in said buffer means in substitution for said digital data representing said first graphic image to produce an intermediate results.

3. The apparatus of claim 1, wherein said digital data S representing said first graphic image and said digital data D representing said second input graphic image each represent at least one of the color component level and opacity of a pixel of said graphic images.

4. The apparatus of claim 3 wherein said color component level data and said opacity data each comprises at least two data bits.

5. The apparatus of claim 3, wherein at least one of said color component level data and said opacity data consists of two data bits.

6. The apparatus of claim 3, wherein:

said processor means causes said operator means to perform a first predetermined sequence of one or more of said second group of operations to obtain resultant color component level data; and said processor means causes said operator means to perform a second predetermined sequence of one or more of said second group of operations to obtain resultant opacity data.

7. The apparatus of claim 6, wherein said first and second predetermined sequences of one or more of said second group of operations are different.

8. The apparatus of claim 1, wherein said operator means comprises a programmed general purpose computer.

9. The apparatus of claim 1, wherein said operator means includes logic circuit means having an output, and having first and second inputs for respectively receiving said digital data S representing said first graphic image and digital data D representing said second graphic image, for producing at said output digital data representing the result of a selected one of said second group of operations.

10. The apparatus of claim 9, wherein said logic circuit means further includes a control input for selecting, in response to a control signal, said selected one of said second group of operations.

11. The apparatus of claim 10, wherein said processor means produces address signals indicative of an address for storing said digital data in said first and second storing means, and said operator means further includes means for producing said control signal in response to the receipt of a predetermined address signal.

12. A method for displaying a composite graphic image which is a composite of first and second input graphic images, each of said composite, and first and second input, graphic images being represented by at least one respective set of digital data, said composite graphic image representing the result of a selected one of a first group of compositing operations on said sets of digital data representing said first and second input graphic images, wherein at least one of said first group of compositing operations includes at least three operands, said method comprising:

storing said digital data representing said first input graphic image in a first memory;

storing said digital data representing said second input graphic image in a second memory;

producing the set of digital data representing said composite graphic image by performing said selected one of said first group of compositing operations as a predetermined sequence of one or more of a second group of operations and storing the result of said second operation in said second memory in substitution for said digital data in said second memory, said second operation selected from the group including SD, S+D, (1−S)D, and S+D−SD, where S and D respectively represent the values of digital data stored in said first and second memories; and displaying said composite graphic image based on said composite image digital data.

13. The method of claim 12, wherein said producing step further comprises:

storing said digital data representing said first graphic image in a buffer;

performing at least one of said second group of operations on said digital data stored in said second memory and said buffer, to produce an intermediate result; and storing said intermediate result in said buffer in substitution for said digital data representing said first graphic image.

14. The method of claim 12, wherein said set of digital data representing said first graphic image and said set of digital data representing said second input graphic image each represent at least one of the color component level and opacity of a pixel of said graphic images.

15. The method of claim 14, wherein said color component level data and said opacity data each comprises at least two data bits.

16. The method of claim 14, wherein at least one of said color component level data and said opacity data consists of two data bits.

17. The method of claim 14, wherein said producing step comprises:

performing a first predetermined sequence of one or more of said second group of operations to obtain resultant color component level data and performing a second predetermined sequence of one or more of said second group of operations to obtain resultant opacity data.

18. The method of claim 17, wherein said first and second predetermined sequences of one or more of said second group of operations are different.

19. A method for combining a first graphic image represented by pixel data stored in a first memory with a second graphic image represented by pixel data stored in a second memory to produce a desired composite graphic image represented by pixel data stored in said second memory in accordance with a group of compositing operations at least one of which includes three operands, wherein the data stored in said first memory includes a multi-bit portion $\delta_s$ indicative of a pixel color component level and an associated multi-bit portion $\alpha_s$ indicative of the opacity of the pixel, and wherein the data stored in said second memory includes a multi-bit portion $\delta_d$ indicative of at least a pixel color component level and an associated multi-bit portion $\alpha_d$ indicative of the opacity of the pixel, said method comprising the steps of:

transforming, in a predetermined sequence of one or more steps, the value of said data portion $\delta_d$ to a new value and storing that new value after each step in said second memory in substitution for the value of said data portion $\delta_d$, wherein each of said data transforming steps transforms the value of said data portion $\delta_d$ in accordance with one or more predetermined transform operations $\delta_d\beta$, $\delta_d+\beta$, $(1-\beta)\delta_d$ and $\delta_d+\beta-\delta_d\beta$, where $\beta$is the value of a predetermined one of $\delta_s$, and $\alpha T_s$; and transforming, in a predetermined sequence of one or more steps, the value of said data portion $\alpha_d$ to a new value and storing that new after each step in said second memory in substitution for the value of said data portion $\alpha_d$, wherein each of said data transforming steps transforms the value of said data portion $\alpha_d$ in accordance with at least one of transform operations $\alpha_{s\ d}$, $\alpha_s+\alpha_d$, $(1-\alpha_s)\alpha_d$ and $\alpha_s+\alpha_d-\alpha_s\alpha_d$.

20. The method of claim 19, further comprising the steps of:

sorting at least one of said data portion $\delta_s$ and $\alpha_s$ in a third memory;.

transforming, in a predetermined sequence of one or more steps, the value of said data portion stored in said third memory to an intermediate new value and storing that intermediate new value in said third memory in substitution for the value of said data portion stored in said third memory, wherein the value of said data portion stored in said third memory is transformed in accordance with a predetermined one of transform operations $(1-\alpha_d)\beta$, $\alpha_d\beta$, $\alpha_d+\beta$, $\alpha_d+\beta-\alpha_d\beta$, where $\beta$ isthe value of a predetermined one of $\delta_s$ and $\alpha_s$; and transforming, in a predetermined sequence of one or more steps, the intermediate new value of said one of said data portions $\delta_s$ and $\alpha_s$ stored in said third memory to a final new value and storing that final new value in said second memory in substitution for the value of said data portion $\delta_d$ stored in said second memory, wherein the intermediate new value is transformed in accordance with transform operation $\delta_d+\beta$, where $\beta$ is the intermediate new value.

21. The method of claim 19, wherein said steps for transforming data portions $\delta_d$ and $\alpha_d$ include:

transforming the value of said data portion $\delta_d$ stored in said second memory to a first new value $\delta_d'$ in accordance with the transform operation $(1-\alpha_s)\delta_d$, and storing said first new value $\delta_d'$ in said second memory in substitution for the value of said data portion $\delta_d$; and transforming the first new value $\delta_d'$ stored in said second memory to a second new value $\delta_d''$ in accordance with the transform operation $\delta_s+\delta_d'$, and storing said second new value $\delta_d''$ in said second memory in substitution for said first new value $\delta_d'$; and transforming the value of said data portion $\alpha_d$ stored in said second memory to a new value $\alpha_d'$ in accordance with the transform operation $\alpha_s+\alpha_d-\alpha_s\alpha_d$, and storing said new value $\alpha_d'$ in said second memory in substitution for the value of said data portion $\alpha_d$;

whereby said first image is placed over said second image to produce said desired composite image in said second memory having pixel information including a color component level value defined by the equation $\delta_s+(1-\alpha_s)\delta_d$, and an opacity value defined by the equation $\alpha_s+\alpha_d-\alpha_s\alpha_d$.

22. The method of claim 19, wherein said steps for transforming said data portion $\delta_d$ include:

transforming the value of said data portion $\delta_d$ stored in said second memory to a first new value $\delta_d'$ by storing the value of said data $\delta_s$ from said first memory in said second memory in substitution for the value of said data portion $\delta_d$;

transforming the first new value $\delta_d'$ stored in said second memory to a second new value $\delta_d''$in accordance with the transform operation $\delta_d'\alpha_d'$ and storing said second new value $\delta_d''$ in said second memory in substitution for said first new value $\delta_d'$; and wherein said steps for transforming said data portion $\alpha_d$ include:

storing said data portion $\alpha_s$ in said buffer;

transforming the value of said data portion $\alpha_s$ stored in said buffer to a new value $\alpha_s'$ in accordance with the transform operation $(1-\alpha_d)\alpha_s$, and storing said new value $\alpha_s'$ in said buffer in substitution for said value $\alpha_s$; and storing said new value $\alpha_s'$ in said second memory in substitution for said value $\alpha_d$;

whereby said first image is combined with said second image to produce said desired composite image in said second memory having pixel information including a color component level value defined by the equation $(1-\alpha_d)\delta_s$, and an opacity value defined by the equation $(1-\alpha_d)\alpha_s$.

23. The method of claim 19, wherein each of said data portions $\delta_d$, $\alpha_d$, $\delta_s$ and $\alpha_s$ consists of two bits of data.

24. Apparatus for displaying a composite graphic image which is a composite of first and second input graphic images, each of said composite, and first and second input, graphic images being represented by at least one respective set of digital data, said composite graphic image representing the result of a selected one of a first group of compositing operations on said sets of digital data representing said first and second input images, wherein at least one of said first group of compositing operations includes at least three operands, said apparatus comprising:

first means for storing said digital data representing said first input image;

second means for storing said digital data representing said second input graphic image;

operator means in data transfer relationship with said first and second storing means for implementing at least one of a second group of operations on digital data stored in said first and second storing means, and for storing a result of said second operation in substitution for said digital data stored in said second storing means;

processor means in controlling relationship with said operator means, said processor means performing said selected one of said first group of compositing operations by causing said operator means to perform a predetermined sequence of one or more of said second group of operations to produce said digital data representing said composite graphic image in said second storing means; and means for converting said composite graphic image digital data into signals for display of said composite graphic image.

25. The apparatus of claim 24, further comprising:

buffer means for storing digital data representing said first graphic image; wherein:

said processor means causes said operator means to perform at least one of said second group of operations on digital data stored in said second storing means and said buffer means, and to store a result of said second operation in said buffer means in substitution for said digital data representing said first graphic image to produce an intermediate result.

26. The apparatus of claim 24, wherein said digital data representing said first graphic image and said digital data representing said second input graphic image each represent at least one of the color component level and opacity of a pixel of said graphic images.

27. The apparatus of claim 26, wherein said color component level data and said opacity data each comprises at least two data bits.

28. The apparatus of claim 26, wherein at least one of said color component level data and said opacity data consists of two data bits.

29. The apparatus of claim 26, wherein:

said processor means causes said operator means to perform a first predetermined sequence of one or more of said second group of operations to obtain resultant color component level data; and said processor means causes said operator means to perform a second predetermined sequence of one or more of said second group of operations to obtain resultant opacity data.

30. The apparatus of claim 29, wherein said first and second predetermined sequences of one or more of said second group of operations are different.

31. The apparatus of claim 24, wherein said operator means comprises a programmed general purpose computer.

32. The apparatus of claim 24, wherein said operator means includes logic circuit means having an output, and having first and second inputs for respectively receiving said digital data S representing said first graphic image and digital data D representing said second graphic image, for producing at said output digital data representing the result of a selected one of said second group of operations.

33. The apparatus of claim 32, wherein said logic circuit means further includes a control input for selecting, in response to a control signal, said selected one of said second group of operations.

34. The apparatus of claim 33, wherein said processor means produces address signals indicative of an address for storing said digital data in said first and second storing means, and said operator means further includes means for producing said control signal in response to the receipt of a predetermined address signal.

35. A method for displaying a composite graphic image which is a composite of first and second input graphic images, each of said composite, and first and second input, graphic images being represented by at least one respective set of digital data, said composite graphic image representing the result of a selected one of a first group of compositing operations on said sets of digital data representing said first and second input graphic images, wherein at least one of said first group of compositing operations includes at least three operands, said method comprising:

storing said digital data representing said first input graphic image in a first memory;

storing said digital data representing said second input graphic image in a second memory;

producing the set of digital data representing said composite graphic image by performing said selected one of said first group of compositing operations as a predetermined sequence of one or more of a second group of operations and storing the result of said second operation in said second memory in substitution for said digital data in said second memory; and displaying said composite graphic image based on said composite graphic image digital data.

36. The method of claim 35, wherein said producing step further comprises:

storing said digital data representing said first graphic image in a buffer;

performing at least one of said second group of operations on said digital data stored in said second memory and said buffer, to produce an intermediate result; and storing said intermediate result in said buffer in substitution for said digital data representing said first graphic image.

37. The method of claim 35, wherein said set of digital data representing said first graphic image and said set of digital data representing said second input graphic image each represent at least one of the color component level and opacity of a pixel of said graphic images.

38. The method of claim 37, wherein said color component level data and said opacity data each comprises at least two data bits.

39. The method of claim 37 wherein at least one of said color component level data and said opacity data consists of two data bits.

40. The method of claim 37, wherein said producing step comprises:

performing a first predetermined sequence of one or more of said second group of operations to obtain resultant color component level data and performing a second predetermined sequence of one or more of said second group of operations to obtain resultant opacity data.

41. The method of claim 40, wherein said first and second predetermined sequences of one or more of said second group of operations are different.

42. Apparatus for generating digital data representing a composite graphic image which is a composite of first and second graphic images, each of said first and second graphic images being represented by digital data, said composite graphic image representing the result of a selected one of a first group of compositing operations on said digital data representing said first and second graphic images, wherein at least one of said first group of compositing operations includes at least three operands, said apparatus comprising:

first means for storing said digital data representing said first graphic image;

second means for storing said digital data representing said second graphic image;

third means, in data transfer relationship with said first and second storing means, for implementing a second group of operations on digital data stored in said first and second storing means, and for storing results of said second operations in said second storing means in substitution for said digital data stored in said second storing means, said second group of operations comprising SD, S+D, (1−S)D, and S+D−SD, where S and D respectively represent the values of digital data stored in said first and second storing means; and fourth means, in controlling relationship with said third means, for performing said selected one of said first group of compositing operations by causing said third means to perform a predetermined sequence of one or more of said second group of operations to produce said digital data representing said composite image.

43. A method for generating digital data representing a composite graphic image which is a composite of first and second graphic images, each of said first and second graphic images being represented by digital data, said composite graphic image representing the result of a selected one of a first group of compositing operations on said digital data representing said first and second graphic images, wherein at least one of said first group of compositing operations includes at least three operands, said method comprising:

storing said digital data representing said first graphic image in a first memory;

storing said digital data representing said second graphic image in a second memory; and producing said digital data representing said composite graphic image by performing said selected one of said first group of compositing operation as a predetermined sequence of one or more of a second group of operations and storing the result of said second operation in substitution for said digital data in said second memory, said second group of operations comprising SD, S+D, (1−S)D, and S+D−SD, where S and D respectively represent the values of digital data stored in said first and second memory.

44. Apparatus for generating digital data representing a composite image which is a composite of first and second graphic images, each of said first and second graphic images being represented by digital data, said composite graphic image being the result of a compositing operation of said digital data representing said first and second input images, said apparatus comprising:

first means for storing said digital data representing said first graphic image;

second means for storing said digital data representing said second graphic image;

third means in data transfer relationship with said first and second storing means for implementing a write function operation on digital data stored in said first and second storing means, and for storing a result of said write function operation in substitution for said digital data stored in said second storing means, said write function operation selected from the group including the operations SD, S+D, (1−S)D, and S+D−SD, where S and D respectively represent the values of digital data stored in said first and second storing means; and forth means, in controlling relationship with said third means, for performing said compositing operation by causing said third means to perform a predetermined sequence of one or more of said write function operations to produce said set of digital data representing said composite graphic image in said second storing means.

45. A method for generating digital data representing a composite graphic image which is a composite of first and second graphic images, each of said composite first and second graphic images being represented by digital data, said composite graphic image representing the result of a compositing operation on said digital data representing said first and second graphic images, said method comprising:

storing said digital data representing said first graphic image in a first memory;

storing said digital data representing said second graphic image in a second memory;

producing said digital data representing said composite graphic image by performing said compositing operation as a predetermined sequence of one or more write function operations and storing the result of said write function operation in substitution for said digital data in said second memory, said write function operation selected from the group including SD, S+D, (1−S)D, and S+D−SD, where S and D respectively represent the values of digital data stored in said first and second memories.

46. Apparatus for generating digital data representing a composite graphic image which is a composite of first and second graphic images, each of said first and second graphic images being represented by digital data, said composite graphic image representing the result of a compositing operation on said digital data representing said first and second graphic images, wherein said compositing operation includes at least three operands, said apparatus comprising:

first means for storing said digital data representing said first graphic image;

second means for storing said digital data representing said second graphic image;

third means, in data transfer relationship with said first and second storing means, for implementing a transformation operation on digital data stored in said first and second storing means, and for storing results of said transformation operation in said second storing means in substitution for said digital data stored in said second storing means, said transformation operation selected from the group including SD, S+D, (1−S)D, and S+D−SD, where S and D respectively represent the values of digital data stored in said first and second storing means; and fourth means, in controlling relationship with said third means, for performing said compositing operation by causing said third means to perform a predetermined sequence of two or more of said transformation operations to produce said digital data representing said composite graphic image.

47. A method for generating digital data representing a composite graphic image which is a composite of first and second graphic images, each of said first and second graphic images being represented by digital data, said composite graphic image representing the result of a compositing operation on said digital data representing said first and second graphic images, wherein said compositing operation includes at least three operands, said method comprising:

storing said digital data representing said first graphic image in a first memory;

storing said digital data representing said second graphic image in a second memory; and producing said digital data representing said composite graphic image by performing said compositing operation as a predetermined sequence of two or more transformation operations and storing the results of said transformation operations in substitution for said digital data in said second memory, said transformation operations selected from the group including SD, S+D, (1−S)D, and S+D−SD, where s and D respectively represent the values of digital data stored in said first and second memory.

* * * * *